UNITED STATES PATENT OFFICE 2,554,473

PROCESS OF PREPARING DERIVATIVES OF 21 - HYDROXY - PREGNENE - (5) - OL - (3) - ONE - (20)

Heinrich Ruschig, Frankfort-on-the-Main, Germany, assignor to Farbwerke Hoechst vormals Meister Lucius & Bruning, Frankfort-on-the-Main-Hoechst, Germany No Drawing. Application April 27, 1949, Serial No. 90,037. In Germany March 18, 1949

3 Claims. (Cl. 260—397.4)

The present invention relates to a process of preparing derivatives of 21-hydroxy-pregene-(5)-ol(3)-one-(20).

The French Patent No. 891,441 describes the manufacture of derivatives of 21-hydroxy-pregnene-(5)-ol-(3)-one-(20) which consists in treating pregnene - (5)-ol-(3)-one-(20)-oxalic acid-(21) in the form of its water-soluble salts of the formula,

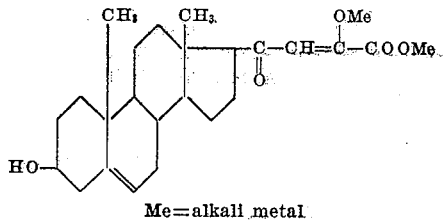

Me=alkali metal with iodine and a basic agent and causing the 21-iodo - pregnene - (5) - ol - (3)-one-(20) obtained which has the formula

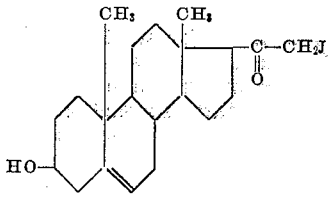

to react with a salt of an organic acid or another compound capable of replacing the iodine.

Now I have found that the derivatives of 21-hydroxy-pregnene-(5)-ol-(3)-one-(20) are obtained in a technically simple manner and in good yield by iodinating already the enol-alkali salt of the pregnene-(5)-ol-(3)-one - (20) - oxalic ester-(21) corresponding to the formula:

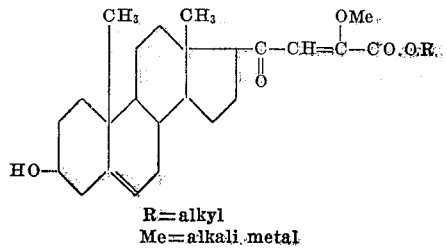

R=alkyl
Me=alkali metal

The process is, for instance, carried out as follows: the enol-sodium or potassium salt of a pregnene-(5)-ol-(3)-one-(20)-oxalic acid ester-(21), for instance the methyl-, ethyl-, propyl-, butyl- or amyl-ester of the formula as referred to above is suspended in methyl-, ethyl- or propyl-alcohol and the calculated quantity of iodine dissolved in methyl-, ethyl- or propyl-alcohol is then caused to flow in at a temperature of from about —30° C. to 0° C. During this operation the 21-iodo-pregnene-(5)-ol-(3)-one-(20)-oxalic ester-(21) of the formula

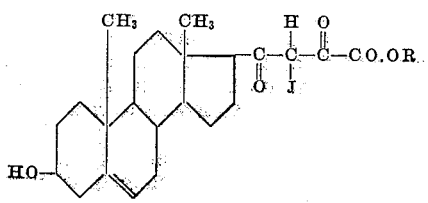

is formed as an intermediate product, this being evident by the gradual transformation of the suspension into a clear solution. The solution assumes a brown-red color. When the addition of iodine is complete, the solution is poured into a strongly dilute aqueous alkaline solution which, moreover, contains an electrolyte, for instance, a solution of sodium chloride or phosphate. By stirring for several hours the acid cleavage into 21-iodo-pregnene-(5)-ol-(3)-one-(20) of the formula

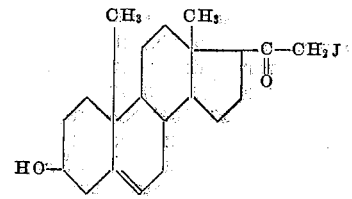

and the oxalic acid compound occurs. The 21-iodo-pregnene-(5)-ol-(3)-one-(20) may be obtained directly by centrifugation or filtration. It is purified preferably by dissolving in methanol and subsequent precipitating with water.

Contrary to the process described in the French patent cited above the 21-iodo-pregnene-(5)-ol-(3)-one-(20) is further processed so as to obtain 21-hydroxy-pregnene-(5)-ol-(3)-one-(20) or the esters thereof having the formula

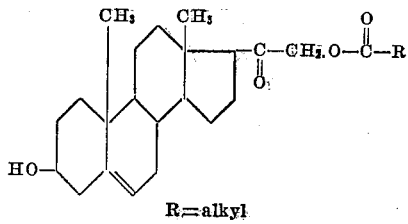

R=alkyl by exchanging the halogen for the acid radical of salts of carboxylic acids in a solvent miscible with water, for instance aqueous acetone or dioxane at neutral to slightly acid reaction. The crude final products obtained from the reaction solutions are then purified by simple or repeated crystallization.

The following example serves to illustrate the invention, but it is not intended to limit it thereto:

4.38 grams (1/100 mol) of the sodium salt of pregnene-(5)-ol-(3)-one-(20)-oxalic acid ethyl ester-(21) are suspended in 50 cc. of methanol; a solution of 2.54 grams of iodine in 60 cc. of methanol is caused to run within 10 minutes at a temperature of −15° C., while stirring, into that mixture. The suspension gradually turns into a red-brown solution, the temperature rises up to −10° C. The whole is further stirred for 30 minutes and the reaction solution is poured into 1100 cc. of water containing 100 cc. of a saturated sodium chloride solution and 2 grams of potassium hydroxide. The mixture is then stirred for 16 hours in the dark whereupon the crude 21-iodo-pregnene-(5)-ol-(3)-one-(20) which has separated in the form of flakes is filtered by suction or centrifuged. It is dissolved in 350 cc. of methanol and carefully precipitated with 700 cc. of water. It is allowed to stand for 24 hours, centrifuged, washed with methanol of 20 per cent strength and dried in the vacuum at 56° C.

The yield amounts to 3.2 grams, the melting point is at 155–156° C. (uncorrected) with decomposition.

The crude 21-iodo-pregnene-(5)-ol-(3)-one-(20) may also be processed directly without any further purification.

3.2 grams of 21-iodo-pregnene-(5)-ol-(3)-one-(20),
220 cc. of acetone
4.3 grams of potassium acetate
55 cc. of water, and
2.5 cc. of glacial acetic acid are boiled for 5 hours under reflux, the reaction solution is then evaporated in the vacuum and the white residue is absorbed with acetic acid ethyl ester and water. The acetic ester solution is washed with sodium bisulfite and water and finally dried over sodium sulfate. After the evaporation is complete a white residue remains which contains the 21-acetoxy-pregnene-(5)-ol-(3)-one-(20). By a crystallization from aqueous and pure acetone it is obtained in the pure state. The yield amounts to 2.1 grams, the melting point is at 179° C.

I claim:

1. A process for producing 21-hydroxy-pregnene-(5)-ol-(3)-one-(20) derivatives which comprises iodinating in the absence of water a pregnene-(5)-ol-(3)-one-(20)-oxalic ester-(21) in the form of an enol alkali salt of the formula

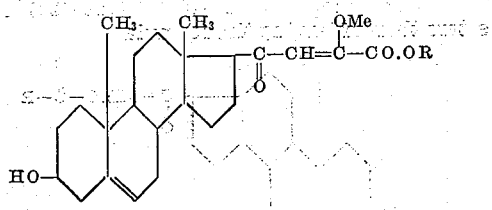

wherein Me stands for an alkali metal and R for an alkyl radical, in a water-miscible solvent at a temperature of from about −30° C. to 0° C., subjecting the thus formed 21-iodo-pregnene-(5)-ol-(3)-one-(20)-oxalic ester-(21) of the formula

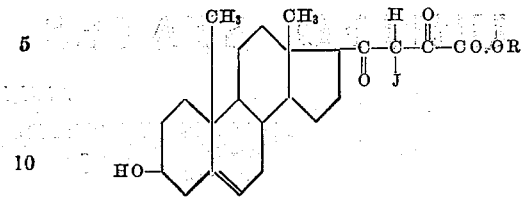

to an acid cleavage in an alkaline medium and reacting the thus formed 21-iodo-pregnene-(5)-ol-(3)-one-(20) of the formula

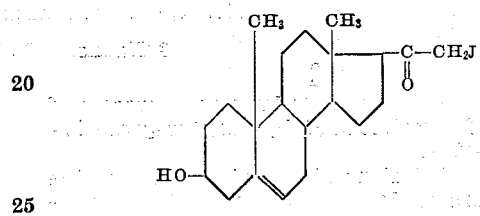

with a carboxylic acid salt in a water-miscible solvent at neutral to weakly acid reaction.

2. A process for producing 21-hydroxy-pregnene-(5)-ol-(3)-one-(20) derivatives which comprises iodinating in the absence of water a pregnene-(5)-ol-(3)-one-(20)-oxalic ester-(21) in the form of an enol alkali salt of the formula

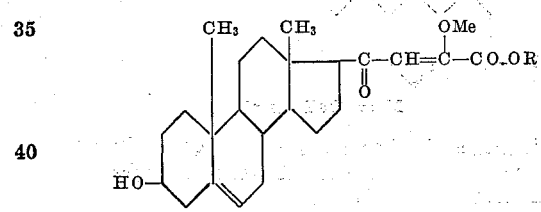

wherein Me stands for an alkali metal and R for an alkyl radical, in a water-miscible solvent at a temperature of from about −30° C. to 0° C., subjecting the thus formed 21-iodo-pregnene-(5)-ol-(3)-one-(20)-oxalic ester-(21) of the formula

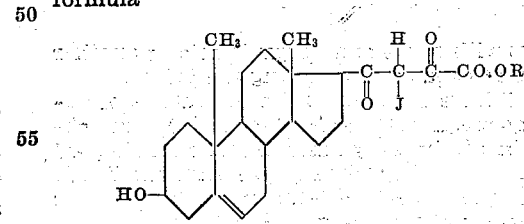

to an acid cleavage in an alkaline medium and reacting the thus formed 21-iodo-pregnene-(5)-ol-(3)-one-(20) of the formula

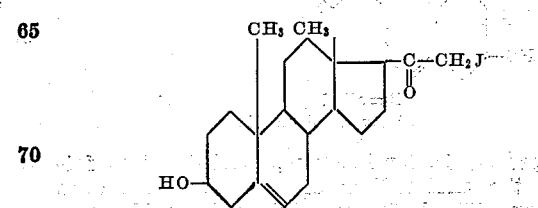

with an alkali acetate in a water-miscible solvent at neutral to weakly acid reaction.

3. A process for producing 21-hydroxy-pregnene-(5)-ol-(3)-one-(20) derivatives which comprises iodinating in the absence of water pregnene-(5)-ol-(3)-one-(20)-oxalic acid ethyl ester-(21) in the form of its enol-sodium salt of the formula:

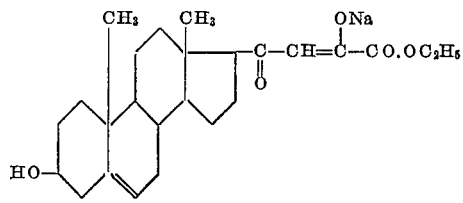

in a water-miscible solvent at a temperature of from about −30° C. to 0° C., subjecting the thus formed 21-iodo-pregnene-(5)-ol-(3)-one-(20-oxalic acid ethyl ester to an acid cleavage in an alkalaline medium and reacting the thus formed 21-iodo-pregnene-(5)-ol-(3)-one-(20) of the formula:

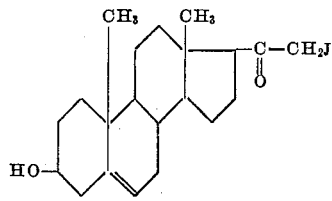

with an alkali acetate in a water-miscible solvent at neutral to weakly acid reaction.

HEINRICH RUSCHIG.

REFERENCES CITED

The following references are of record in the file of this patent:

FOREIGN PATENTS

| Number | Country | Date |
|---|---|---|
| 891,441 | France | Dec. 11, 1943 |